United States Patent
Spink et al.

(10) Patent No.: US 7,160,358 B2
(45) Date of Patent: Jan. 9, 2007

(54) POLLUTION CONTROL IN WOOD PRODUCTS DRYER

(75) Inventors: Edward F. Spink, Waterloo (CA); Robert A. Allan, Kitchener (CA)

(73) Assignee: Turbosonic Inc., Waterloo (CA)

( * ) Notice: Subject to any disclaimer, the term of this patent is extended or adjusted under 35 U.S.C. 154(b) by 0 days.

(21) Appl. No.: 11/102,763

(22) Filed: Apr. 11, 2005

(65) Prior Publication Data

US 2005/0229780 A1  Oct. 20, 2005

Related U.S. Application Data

(60) Provisional application No. 60/560,611, filed on Apr. 9, 2004.

(51) Int. Cl.
 *B03C 3/014* (2006.01)
(52) U.S. Cl. .............................. 95/65; 34/467; 34/480; 95/69; 95/70; 95/71; 95/78; 96/53; 96/55; 96/57; 96/61
(58) Field of Classification Search ............... 96/52, 96/53, 55, 57, 61; 95/69–72, 63–65, 78; 34/443, 448, 467, 480
See application file for complete search history.

(56) References Cited

U.S. PATENT DOCUMENTS

| | | | | |
|---|---|---|---|---|
| 2,357,355 A | * | 9/1944 | Penney ........................... | 96/27 |
| 2,935,375 A | * | 5/1960 | Boucher ........................ | 423/210 |
| 3,512,340 A | * | 5/1970 | Golucke et al. ............... | 95/60 |
| 3,745,751 A | * | 7/1973 | Zey et al. ..................... | 422/161 |
| 4,070,424 A | * | 1/1978 | Olson et al. ................. | 261/142 |
| 4,141,698 A | * | 2/1979 | Kihlstedt et al. ............... | 95/69 |
| 4,885,139 A | * | 12/1989 | Sparks et al. ................ | 422/169 |
| 4,893,752 A | * | 1/1990 | Spink et al. .............. | 239/427.3 |
| 4,957,512 A | * | 9/1990 | Denisov et al. ................. | 95/66 |
| 5,295,310 A | * | 3/1994 | Eriksson ....................... | 34/480 |
| 5,308,589 A | * | 5/1994 | Yung .......................... | 422/169 |
| 5,364,457 A | * | 11/1994 | Cameron ........................ | 96/27 |
| 5,599,508 A | * | 2/1997 | Martinelli et al. .......... | 422/169 |
| 5,603,751 A | * | 2/1997 | Ackerson ..................... | 95/268 |
| 5,843,210 A | * | 12/1998 | Paranjpe et al. ............... | 95/59 |
| 5,855,652 A | * | 1/1999 | Talley .......................... | 96/44 |
| 5,917,138 A | * | 6/1999 | Taylor .......................... | 96/61 |
| 5,922,290 A | * | 7/1999 | Jenne et al. ................ | 422/173 |
| 6,106,592 A | * | 8/2000 | Paranjpe et al. ............... | 95/65 |
| 6,156,098 A | * | 12/2000 | Richards ........................ | 95/65 |
| 6,267,802 B1 | * | 7/2001 | Baldrey et al. ................ | 95/58 |
| 6,974,494 B1 | * | 12/2005 | Zahedi .......................... | 95/73 |
| 2004/0139853 A1 | * | 7/2004 | Bologa et al .................. | 95/64 |

FOREIGN PATENT DOCUMENTS

| | | | |
|---|---|---|---|
| GB | 556939 | * | 10/1943 |
| WO | WO 92/19380 | * | 11/1992 |

* cited by examiner

*Primary Examiner*—Richard L. Chiesa
(74) *Attorney, Agent, or Firm*—Michael I. Stewart; Sim & McBurney

(57) ABSTRACT

Contaminant laden gas streams from wood product dryer operations, and other sources, are purified. The gas stream first is saturated with moisture by contacting the gas stream with fine liquid droplets which entrain particulates. The gas stream then is subjected to a plurality of separate particulate and liquid droplet removal steps before a droplet-free gas stream having substantially reduced particulate contaminant levels is passed to a burner for removal of volatile organic compounds from the gas stream.

23 Claims, 10 Drawing Sheets

US 7,160,358 B2

POLLUTION CONTROL IN WOOD PRODUCTS DRYER

FIELD OF INVENTION

The present invention is concerned with pollution control in the wood products industry.

BACKGROUND OF THE INVENTION

The wood products industry has been beset with many problems with pollution control equipment, including maintenance problems, unplanned downtime due to material build up in scrubbers and wet electrostatic precipitators (WESP) and in thermal oxidizer systems, including regenerative thermal oxidizer (RTO) and regenerative catalytic oxidizer (RCO) degradation caused by deposition of particulates and inorganic salts on ceramic media, causing plugging and deterioration of the media from chemical attack.

The applicants have found that such problems are caused by lack of pre-cleaning prior to RTO/RCO, lack of focus on pre-scrubbing ahead of WESP, WESP design and operation, and poor mist elimination and droplet carryover into the RTO/RCO.

The present invention seeks to solve such problems by modification to the pollution control equipment and procedures used in the wood products industry. The invention is illustrated, as disclosed below, by reference to pollution control of sawdust and wood chip dryer emissions, but the principles are applicable to pollution control to other wood products dryers and other sources of gas-borne pollution.

SUMMARY OF INVENTION

In the present invention, existing pollution control equipment associated with a wood products dryer has been modified to reduce particulate emissions. The modifications which were effected are as follows:

- a flue gas recycle duct was installed from the cyclone outlet to the dryer inlet, reducing gas flow to the RTO and WESP.
- the existing pre-scrubber was modified to provide an inertial separation baffle in the drop-out chamber and to provide an air atomizing nozzle immediately upstream of the venturi scrubber.
- the existing WESP was modified by replacing the conventional transformer rectifier sets with high frequency transformer rectifier units (HF TR-Set) and to replace the mesh pad mist eliminator at the WESP outlet by a proprietary hood, as more fully described in U.S. patent application Ser. No. 10/892,124 filed Jul. 16, 2004 (WO 2005/007295), the disclosures of which are incorporated herein by reference.

Combinations of one, two or more of these modifications may be made, as desired or needed in any particular wood products dryer installation.

Modifications to the scrubber and WESP and addition of flue gas recirculation resulted in:

- a clear relationship was measured between front-half outlet loading and energy input to the air atomizing nozzle. Using both the HF TR-Set and medium energy input to the air atomizing nozzle, a 40% reduction in outlet emissions can be achieved.
- the HF TR-Set improved operating voltage by 24% and overall power input by 386%.
- average emission reduced by 21% using the HF TR-set in addition to other modifications.
- the effectiveness of the air atomizing nozzle was more pronounced using the high frequency TR-Set. By improving discharge electrode design, it is anticipated that a greater improvement can be achieved.
- installation of the proprietary hood in place of the mesh mist eliminator pads not only eliminated servicing problems but measurements showed no droplet carry-over from the WESP.

The use of effective prescrubbing reduces the particulates, tars, pitch, sub-micron salts and other condensibles in the gas stream and minimizing their carryover into the WESP, thereby improving WESP performance and maintenance requirements.

The improvements in performance achieved herein serve to extend the life of the RTO ceramic media, with specific tests showing that the RTO may be converted with catalyst into a Regenerative Catalytic Oxidizer (RCO), resulting in a significant reduction in the required energy.

Accordingly, in one aspect of the present invention, there is provided a method for purifying a gas stream containing gas-borne contaminants, which comprises contacting said gas stream with fine liquid droplets to saturate the gas stream with moisture and to entrain particulates in the liquid droplets, subjecting said gas stream to wet electrostatic precipitation to electrostatically separate liquid droplets from the gas stream, and subjecting said gas stream to mist elimination to remove residual liquid droplets to provide a product gas stream.

In another aspect of the present invention, there is provided an apparatus for purifying a gas stream containing gas-borne contaminants, which comprises a scrubbing duct for conveying the gas stream from an inlet end to an outlet end, an air-water dual fluid nozzle located in the scrubbing duct for producing liquid droplets having a Sauter size distribution of less than 500 microns, preferably less than 200 microns and more preferably less than 100 microns, an electrostatic precipitator downstream of the outlet of the scrubbing duct for electrostatically separating liquid droplets from the gas stream, and a mist elimination device for removing residual droplets from the gas stream.

DESCRIPTION OF INVENTION

The problems of the wood products industry are indicated above. Areas for improvement include prescrubbing, gas flow distribution, insulators and insulator design, high frequency TR sets, electrodes, mist elimination, water treatment, dryer recirculation and catalyst use. The present invention seeks to address these issues, both individually and collectively.

In providing the improvements of the present invention, certain performance goals were set, including gas saturation, particulate and condensable removal both by pre-scrubber optimization and WESP optimization, mist elimination with no droplet carryover, minimum maintenance, highest overall efficiency and low installation cost.

The prescrubber operation requires saturation of the gas stream with moisture, condensation of volatile compounds and capture of particulates. We have found that optimum particle capture is achieved using water droplets which are sized about 15 to 20 times the size of the particles to be captured.

The provision of droplets of an appropriate size is achieved by using a dual-fluid gas atomizer of the type described in U.S. Pat. No. 4,893,752, the disclosure of which is incorporated herein by reference. Such atomizing nozzles are erosion and plug-resistant, minimizing downtime and are easy to access and maintain. Large orifice diameters permit recirculation of high solids liquids.

The nozzles are able to provide a droplet distribution as small as 5 microns, with over 50 trillion droplets being produced from a single US gallon of liquid representing a surface area of 50,000 ft$^2$. Scrubber operations are able to achieve over 80% removal of organic and inorganic condensibles, up to 79 wt % removal of particulates and over 80% removal of inorganic salts. With more pollutants removed by the scrubber operation, less pollutants pass on to the WESP, improving overall efficiency and significantly reducing WESP build up and maintenance requirements.

Mist elimination in WESP operation is often provided by mesh pads or chevrons located at the outlet from the WESP. Both have problems associated with them. Mesh pads are best suited for the removal of entrained droplets from particulate-free gas streams, with high removals being achieved at low micron sizes. However, pads often suffer plugging problem where fiber, particulates and volatile organic compounds (VOCs), (such as tars and pitch) are present in the gas stream. Chevrons provide a high efficiency entrainment separation with limit drop sizes of 15 to 25 microns, depending on gas velocity and blade spacing, but can also suffer from plugging problems.

Figure 5:
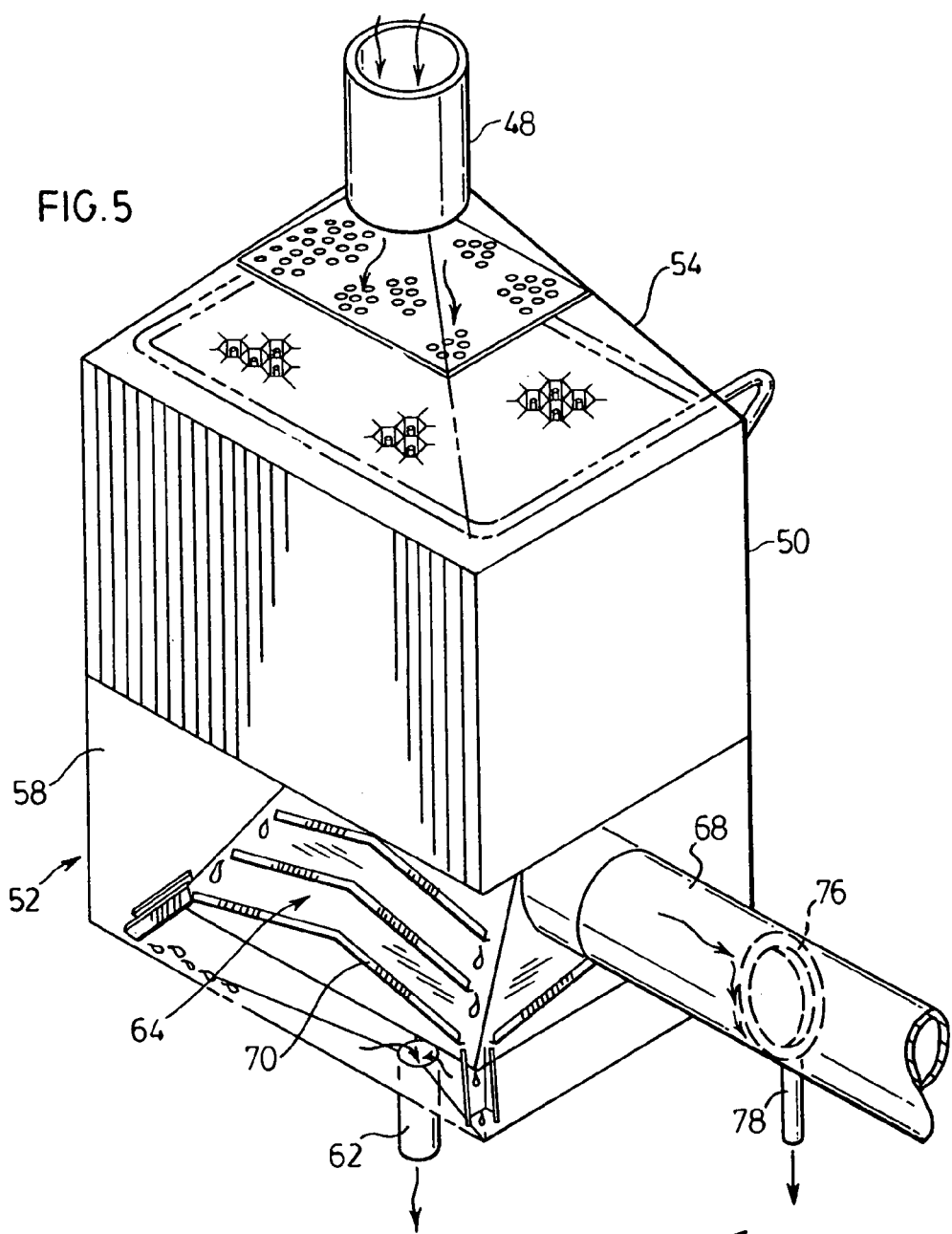
FIG. 5 is a perspective view of a WESP incorporating a novel form of mist eliminator.
Figure 7:
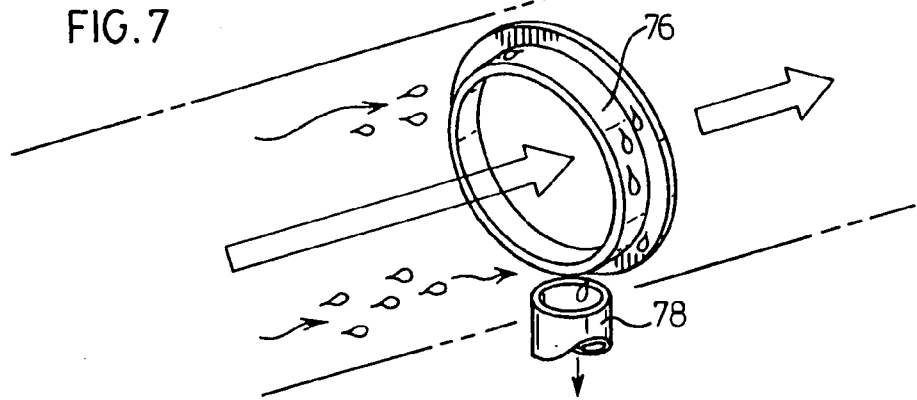
FIG. 7 is a detail of a ring channel of the mist eliminator of FIG. 5.
Figure 6:
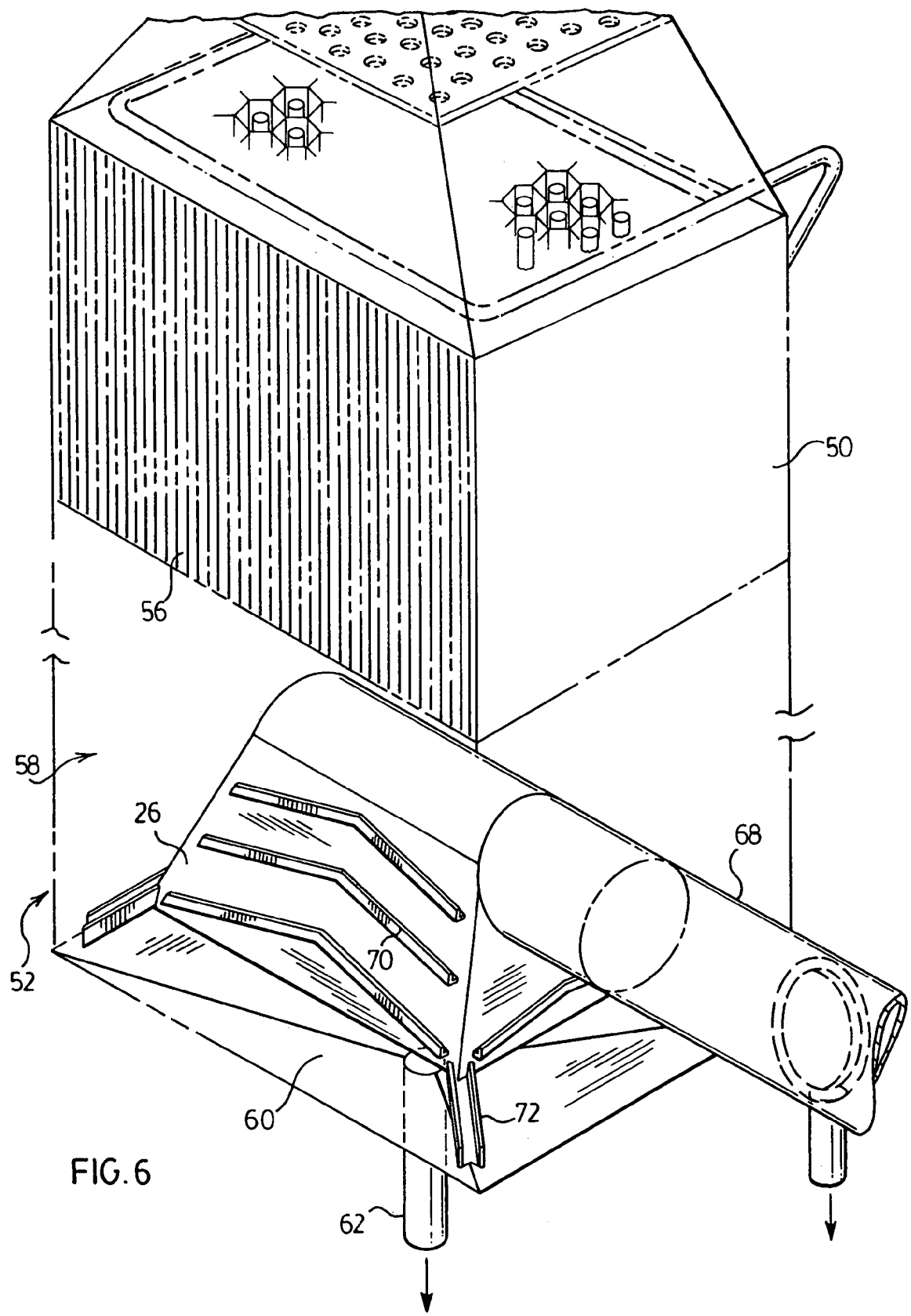
FIGS. 6, 6A and 6B are close-up view of the mist eliminator of FIG. 5.
Figure 6A:
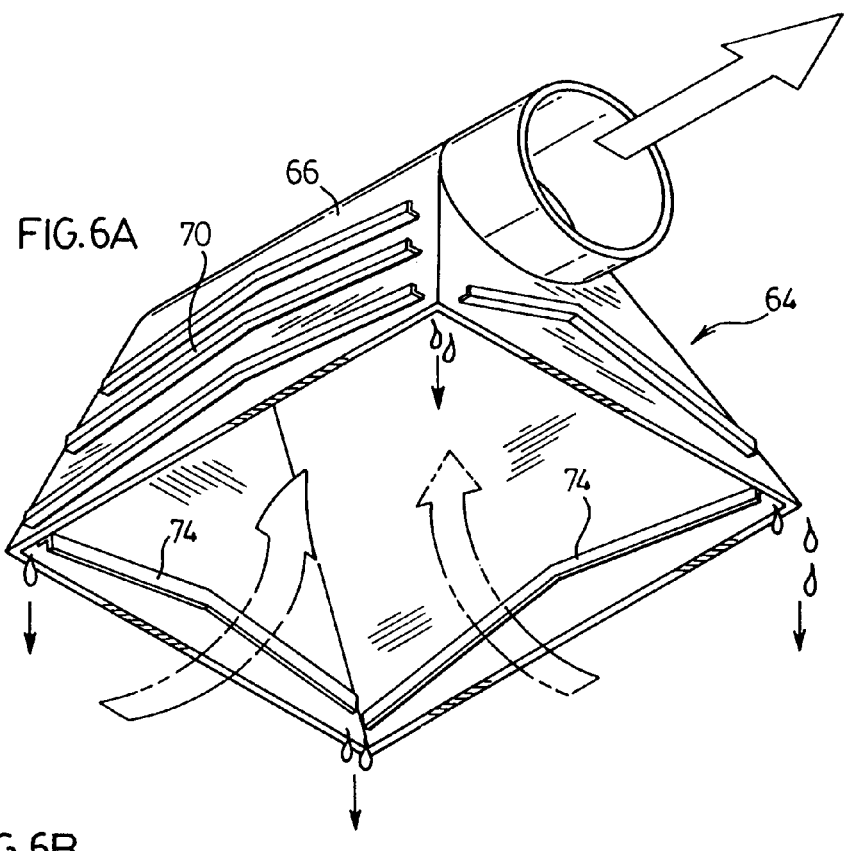
Figure 6B:
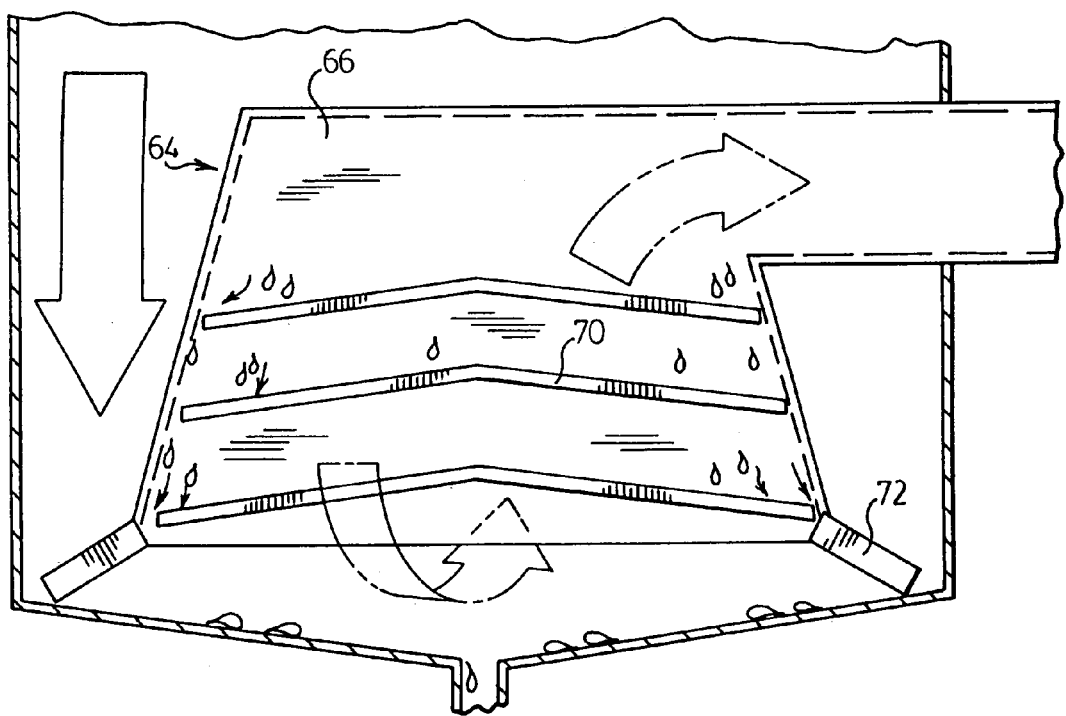

The present invention overcomes the inherent limitations and drawbacks of mesh pads and chevrons by the use of a hood arrangement as described in the aforementioned U.S. patent application Ser. No. 10/892,124. A schematic of the hood arrangement in relation to a WESP is seen in FIGS. 5 to 7. This hood arrangement prevents liquid droplet carryover, even during flushing of the WESP, and no additional mist elimination is required. The hood arrangement requires no maintenance.

Catalyst can be used to lower the activation energy for a given reaction. To oxidize organic compounds which may be present in the gas stream, heat is the activation energy necessary to complete the reaction. RTO operates at about 1450° to 1550° F. while RCO operates at about 800° F., representing a considerable energy savings where a catalyst can be used. Catalyst operation results in little or no carbon monoxide and very low $NO_x$ emissions. The much lower operating temperature leads to longer oxidizer life. Removal of the organic and inorganic particulates in the pre-scrubber, WESP and mist eliminator, as provided herein, eliminates these potential contaminants from reaching the inlet to the RTO, enabling catalytic operation to be achieved without interruption to clear fouled catalyst and the potential deleterious effects of masking or poisoning the catalyst.

DESCRIPTION OF PREFERRED EMBODIMENT

Figure 1:
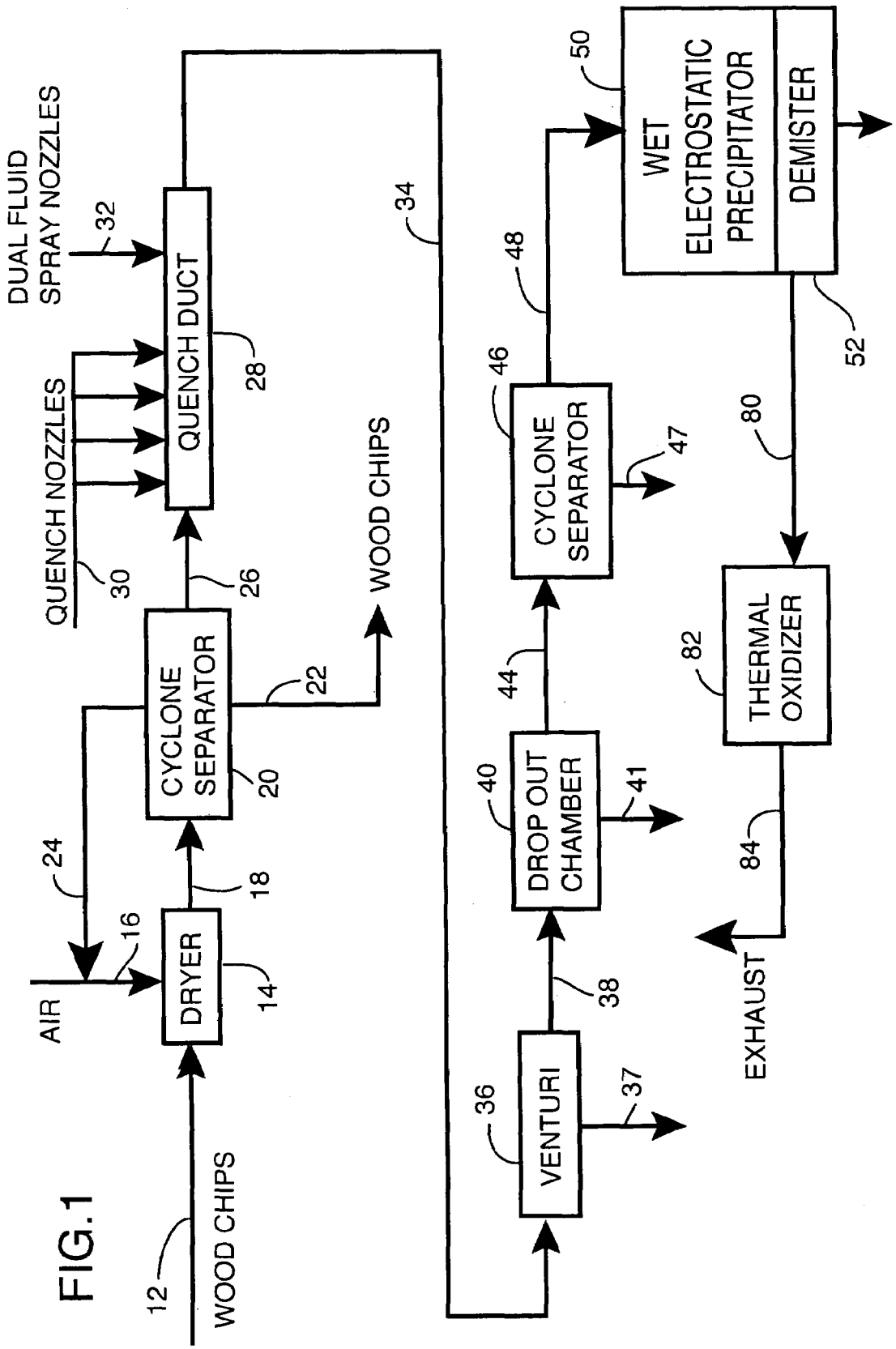
FIG. 1 is a schematic representative of a pollution control system for a wood products dryer provided in accordance with one embodiment of the invention.

FIG. 1 is a schematic flow sheet of a pollution control system 10 associated with a wood products dryer operation modified in accordance with one embodiment of the invention.

Moist wood chips, sawdust, wood fiber, or other wood products are fed by line 12 to a dryer 14 wherein they are dried by a heated air stream 16 and the dried chips are transported in the air stream by line 18 to a cyclone separator 20, wherein the dried chips are separated from the air stream and collected by line 22. These elements are standard elements of a wood particle or wood chips dryer operation.

A portion of the air stream from the cyclone separator is recycled by line 24 to the air inlet 16 to the dryer 14. This modification to the standard arrangement reduces the gas flow in the remaining elements of the system, including the WESP and RTO.

The air stream exiting the cyclone separator in line 26 contains a variety of pollutants, including organic and inorganic particulates, hazardous air pollutants (HASP), and volatile organic compounds, which must be removed before the air stream can be vented from the system.

The air stream first is passed through a quench duct 28, wherein the temperature of the gas stream is cooled by water fed by hydraulic quench nozzles 30 and also intended to saturate the air stream with moisture, which is necessary for the WESP to operate efficiently. It has been found that existing quench nozzles are not efficient in saturating the gas stream with moisture, or in scrubbing and condensing contaminants and pollutants.

To remedy this defect, a TurboSonic air-atomizing two-phase spray nozzle 32 of the type described in U.S. Pat. No. 4,893,752 was used to replace one existing quench nozzle at the downstream end of the tube 28, spraying water cocurrently to the air flow in the quench tube 28. The characteristics of this nozzle are such that the energy level, micron size and liquid-to-gas ratio (l/g) can be varied at will and may be selected for optimum performance. The nozzle provides a spray of fine water droplets in the gas stream which remove particulates and soluble gas, condenses VOC's and saturates the gas stream with moisture.

Any other nozzle able to provide a Sauter particle size distribution less than 500 microns, preferably less than 200 microns and optionally less than 100 microns may be used as the nozzle 32. These droplet sizes compare to the approximately 800 microns that are the smallest droplet size produced by conventional hydraulic nozzles.

Figure 2:
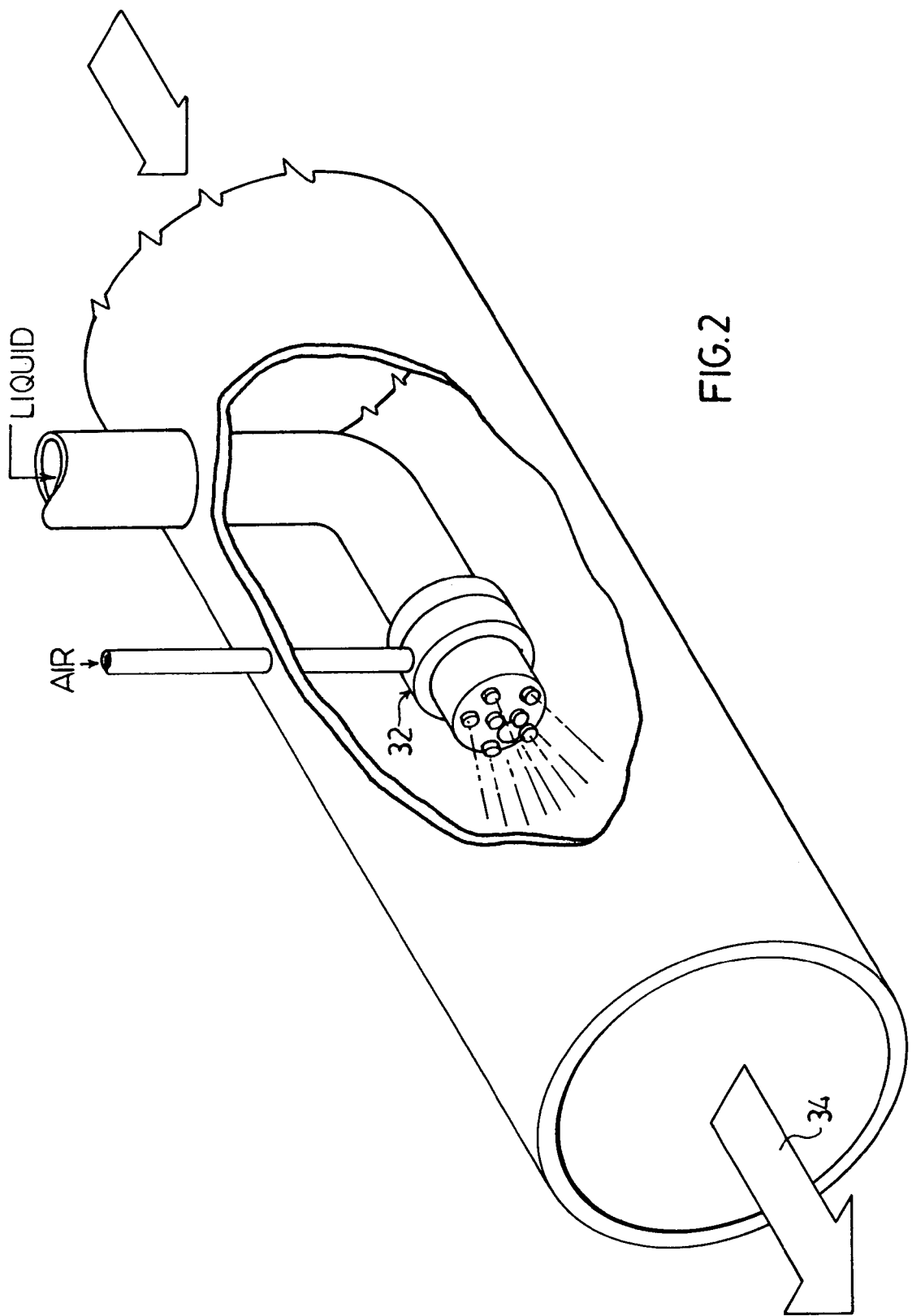
FIG. 2 is a perspective, cut-away view of a dual-fluid spray nozzle.

The fine liquid droplets entrain particulates from the gas stream. A detail of the dual-fluid spray nozzle is shown in FIG. 2.

The use of the dual-fluid spray nozzle provides a significant boost to prescrubber efficiency. With more material removed in the downstream venturi, drop-out chamber and cyclonic separator described below, less material enters WESP, reducing the possibility of build up on WESP internals. The complete humidification also discourages build up in the WESP in that the drying effect caused by incomplete saturation is no longer present, resulting in the complete irrigation of WESP internal surfaces. There is a light constant washdown of the WESP internal surfaces which does not affect the electrical performance of the WESP.

Figure 3:
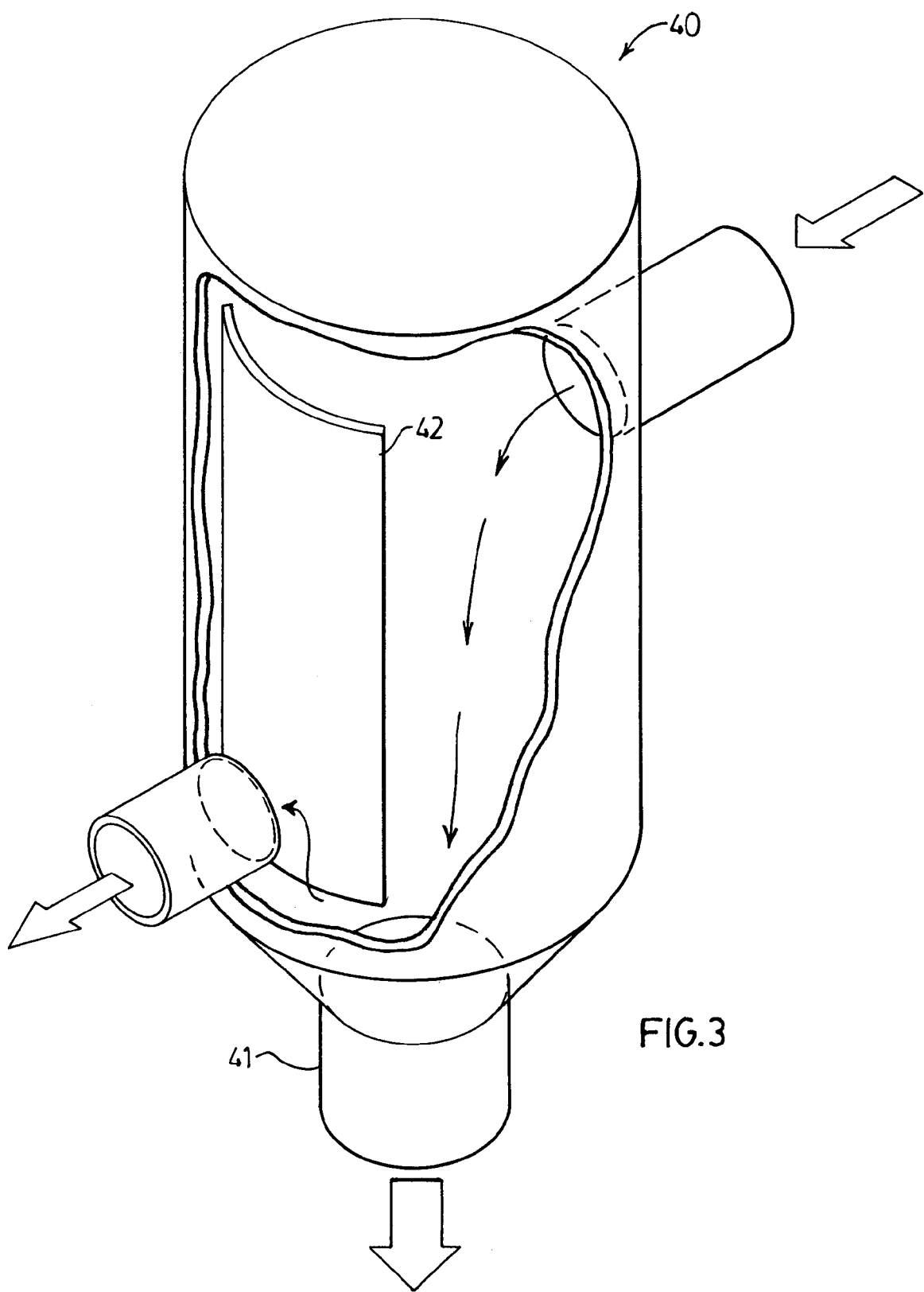
FIG. 3 is a perspective, cut-away view of a modified drop-out chamber.

The gas stream, now saturated with moisture and at its adiabatic dew point, is passed by line 34 through a venturi 36 and then by line 38 to a drop-out chamber 40 to remove large particulates by lines 37 and 41 respectively. As can be seen from FIG. 3, the drop-out chamber 40 is modified to add a baffle 42 which extends from the upper closure downwardly to below the height of the outlet, so as to provide more effective removal of large droplets of moisture and particulates from the gas stream by inertial means, thereby reducing the particulates load on the downstream elements.

The gas stream next is passed by line 44 to a cyclonic separator 46. The cyclonic separator removes entrained particulate-laden droplets from the gas stream by line 47.

The cyclonic flow of the gas stream in the cyclonic separator results in particulates and droplets impinging on the wall of the cyclonic separator and running down the wall to a lower outlet.

The gas stream then is passed by line 48 to a WESP 50. The low frequency rectifier set for the WESP 50 was replaced by a high frequency transformer rectifier set. Tests were carried out with respect to the modified installation with or without the TurboSonic nozzle 32 at three energy levels and with and without the high frequency rectifier set. When the TurboSonic nozzle 32 was operated, the hydraulic quench nozzle 30 immediately upstream was turned off so as not to interfere with the TurboSonic nozzle spray pattern. The dryer was operated at continuous steady state operation for all tests. The WESP was flushed only before the commencement of each test. The results obtained are discussed below.

The conventional mesh pad located at the outlet from the WESP 50 was replaced by a discharge hood plenum 52 constructed as shown in FIGS. 5 to 7. The purpose of the hood 52 is to remove droplet carryover from the gas stream of the downflow WESP during both normal operation and flushing of the unit, as described in the aforementioned U.S. patent application Ser. No. 10/892,124.

In FIGS. 5 to 7 are shown a WESP installation 50 modified to include a mist eliminator 52. The WESP installation 50 is of conventional construction comprising vertically-arranged discharge electrodes and collecting electrodes. Any desired arrangement of such elements may be employed, including square tube, round tube, hexagonal tube or plate. The moisture-laden gas stream to be treated is fed through an inlet header 54 to the upper inlet to the WESP down through the tubes containing the electrodes to the lower outlet 56.

Connected to the lower outlet 56 is the mist eliminator device 52 which includes a chamber 58 having a sloped bottom wall 60 to a moisture outlet 62. Inside the chamber 58 is a hood 64 comprising upwardly sloping walls 66.

The mist eliminating device 52 accelerates the gas flow entering the device, causing droplets of free moisture to accelerate downward and then break free of the gas stream as the gas stream turns approximately 180 degrees into the interior of the hood 64 and from there to the gas outlet 68 from the chamber.

A problem of moisture moving down the outer wall 66 of the hood 64 and dripping off the edge of the hood 64 to be swept into the exiting gas stream, is eliminated by providing a series of drip rings or guides or gutters 70 on the external walls 66 of the hood 64. The gutters 70 are downwardly sloping from an apex to guide the moisture on the hood to the sides of the walls and then to drains 72 from which the accumulated moisture drops into the lower portion of the chamber 58 to the moisture outlet 62.

To capture any moisture which may be swept into the gas stream, further gutters 74 are provided on the interior wall of the hood 64. In order to capture any moisture which may remain or accumulate on the inner walls of the gas outlet 68 and which is swept along by the gas stream, a ring channel 76 may be provided on the inner wall of the outlet 68 with any collected moisture draining through drain 78 to the moisture outlet.

The gutters 70 may also provide structural support to the hood 68.

The gas stream finally is passed by line 80 to a thermal oxidizer 82 before being discharged to stack by line 84.

Figure 4:
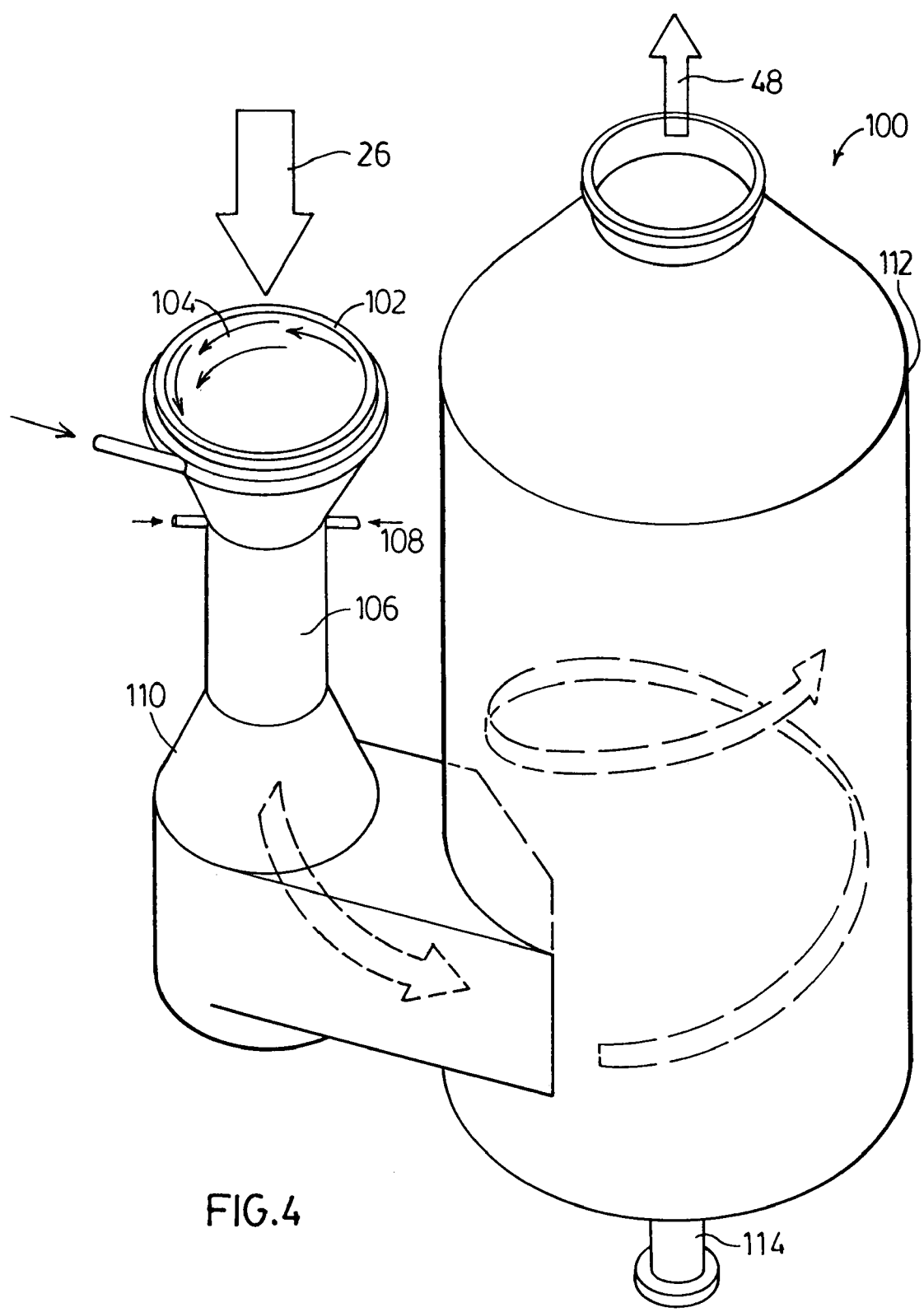
FIG. 4 is a perspective view of a venturi scrubber and separator.

In another embodiment of the invention, the quench duct, venturi, drop out chamber and cyclonic separator are replaced by a venturi scrubber 100 as seen in FIG. 4. The gas stream 26 enters the mouth of the venturi 102 which is maintained wet by a swirl of water 104 to avoid a wet-dry interface where build-up may occur. The gas stream then enters the venturi throat 106 to which water is fed by line 108.

The gas stream, saturated and cooled to the adiabatic dew point exits the downstream end of the venturi 110 and passes tangentially into a separation chamber 112. The cyclonic flow of the gas stream in the separation chamber 112 results in particulates and particulate-laden droplets impinging on the wall of the separation chamber and running down the wall to a lower outlet 114.

The air stream 48 then passes to the WESP 50.

EXAMPLES

Example 1

This Example described test data from tests conducted on the modified system described above with respect to FIGS. 1 to 7.

Tests were carried out to ascertain the effects of the modifications discussed above to the efficiency of removal of contaminants from the air stream from the dryer. The results obtained are depicted in FIGS. 8 to 10.

Figure 8:
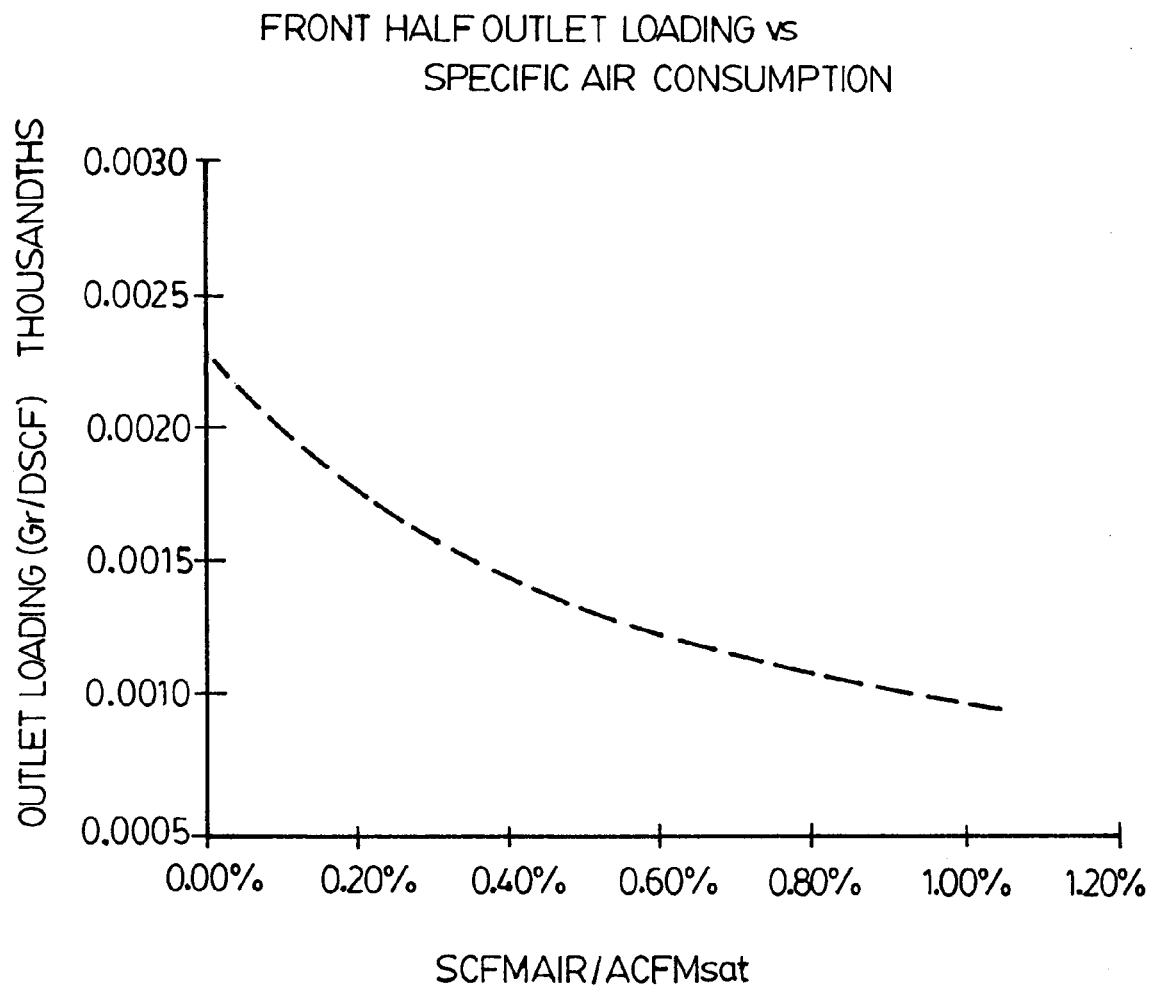
FIG. 8 is a graphical representation of the front half outlet loading vs. specific air consumption by the dual-fluid spray nozzle.

FIG. 8 shows the effect of air pressure at the dual-fluid spray nozzle on outlet particulate loading from the mist eliminator hood.

Figure 9:
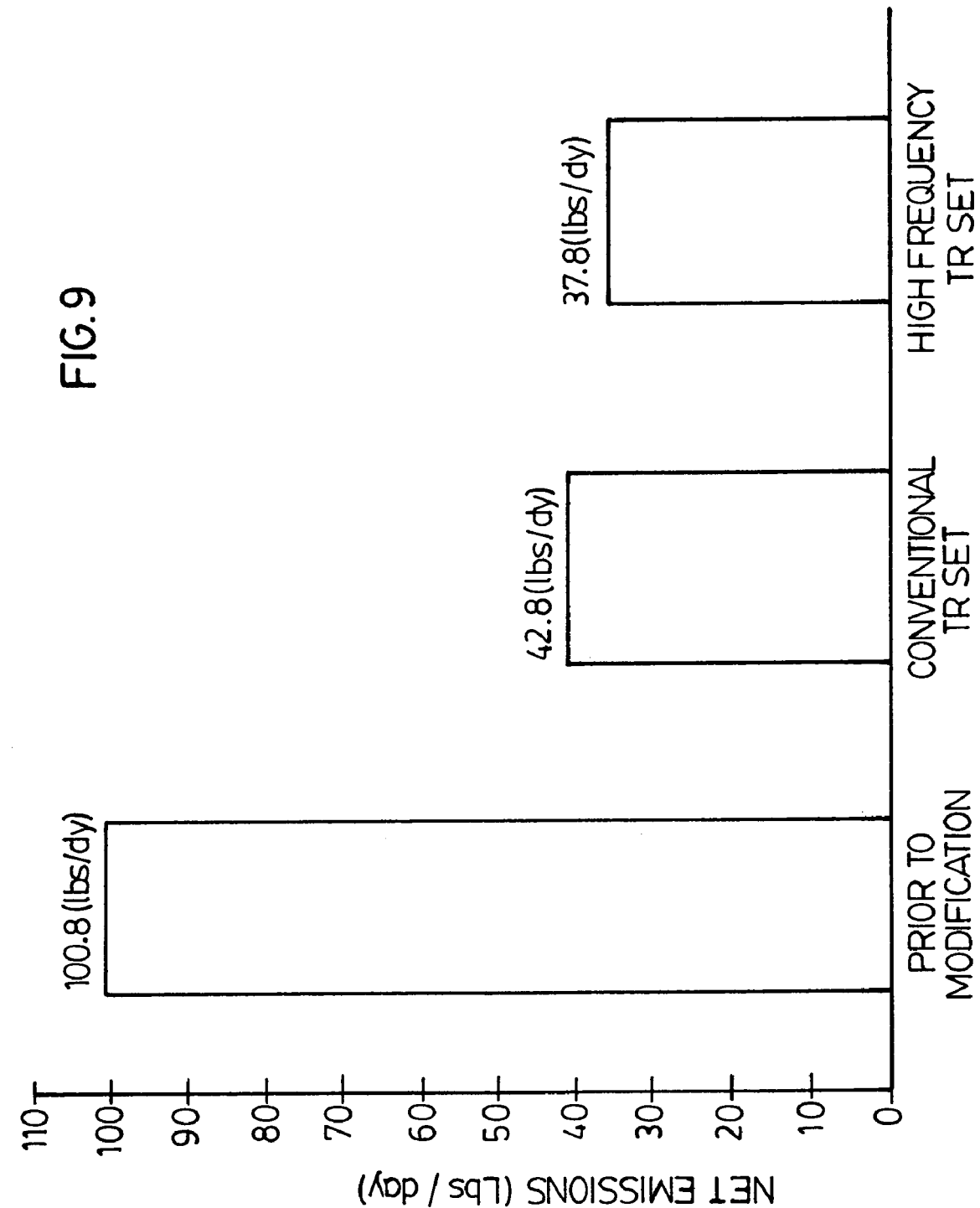
FIG. 9 is a graphical representation of the reduction in emission achieved using the dual-fluid spray nozzle modification both with a conventional TR set and a high frequency TR set for the WESP.

FIG. 9 shows the combined effect of the use of the dual-fluid spray nozzle in combination with the conventional TR set and the high frequency T/R set.

Figure 10:
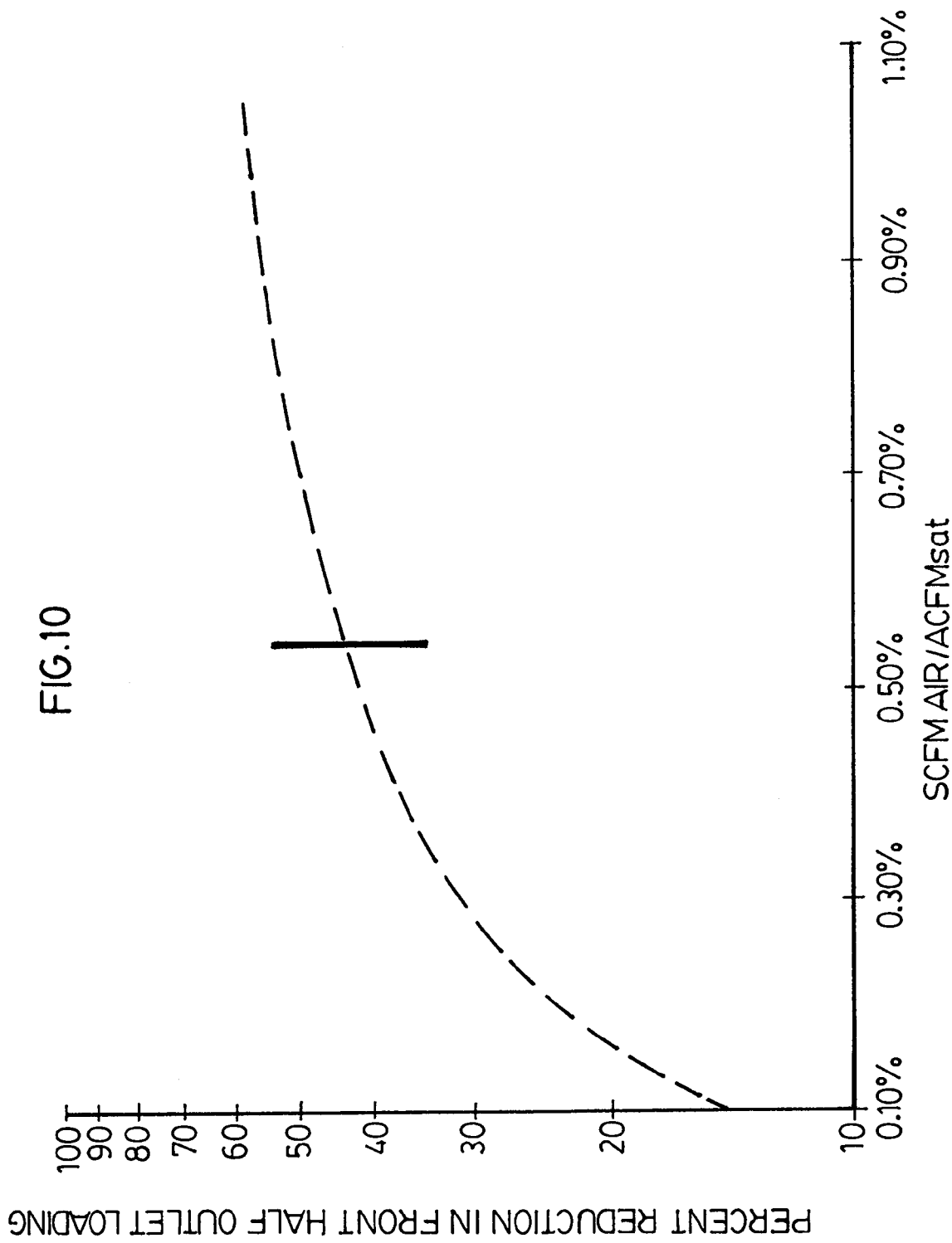
FIG. 10 is a graphical representation of reduction of percentage in front half loading vs. specific air consumption by the dual-fluid spray nozzle.

FIG. 10 shows the effect of the air pressure on percent reduction of outlet particulate loading.

Overall, there was achieved over 80% removal of organic and inorganic condensibles, up to 79% removal of particulates and over 80% removal of inorganic fraction while there was no detected moisture carry-over from the mist elimination hood.

SUMMARY OF DISCLOSURE

In summary of this disclosure, particulates and other contaminants produced in wood product dryers are reduced by a variety of measures. Modifications are possible within the scope of the invention.

What we claim is:

1. A method for purifying a gas stream containing gas-borne contaminants which comprises:

contacting said gas stream with fine liquid droplets from a dual-fluid atomizer nozzle to saturate the gas stream with moisture and to entrain particulates in the liquid droplets, subjecting said gas stream to wet electrostatic precipitation in a wet electrostatic precipitator to electrostatically separate liquid droplets from the gas stream, said wet electrostatic precipitator having an upper gas inlet and a lower gas outlet and a plurality of vertical electrodes between said inlet and said outlet, and subjecting said gas stream to mist elimination to remove residual liquid droplets in a mist elimination device comprising:

an enclosure having an upper inlet in unobstructed fluid flow communication with the lower outlet of the wet electrostatic precipitator, a lower outlet for collected liquid and a second outlet for said product gas stream, a hood located generally axially in said enclosure having walls sloping downwardly from an upper crown to a lower extremity defining an exterior and a space beneath the hood, at least one moisture collection channel provided on the exterior surface of said walls positioned to collect liquid on said walls and guide the collected liquid to at least one flow channel positioned to direct collected liquid to below the hood towards said lower outlet, at least one moisture collection channel provided on an interior surface of the walls positioned to collect liquid entrained in the gas stream and passing from the exterior of the hood into the space beneath the hood, and an outlet duct communicating with the space beneath the hood and joined to the second outlet for guiding gas entering the space beneath the hood to the second outlet.

2. The method of claim 1 wherein said gas stream arises from a wood products drying operation and contains particulates which are inorganic and organic in nature as well as volatile organic compounds as said gas-borne contaminants and the product gas stream is passed to a burner for removal of volatile organic compounds.

3. The method of claim 2 wherein said wood products drying operation involves drying moist wood particles in a hot air stream in a dryer, conveying dried wood particles in the air stream to a cyclonic separation wherein the dried wood particles are separated from the air stream to provide said gas stream, and wherein a portion of said gas stream is recycled to said dryer.

4. The method of claim 2 wherein said dual-fluid atomizer nozzle produce liquid droplets having a Sauter size distribution of less than about 500 microns.

5. The method of claim 4 wherein said fine liquid droplets are contacted with the wood products dryer air stream in sufficient quantity to saturate the air stream and to reduce the temperature of the air stream to the adiabatic saturation temperature of the gas stream to produce a moisture-saturated air stream.

6. The method of claim 5 wherein said moisture-saturated air stream is passed through a drop-out chamber wherein the air stream impinges on an inertial separation baffle to cause particulate-laden droplets to be removed from the air stream.

7. The method of claim 5 or 6 wherein said moisture-saturated air stream is passed through a cyclonic separator to remove entrained particulate-laden droplets from the air stream.

8. The method of claim 4 wherein said dual-fluid nozzle produces liquid droplets having Sauter size distribution of less than about 200 microns.

9. The method of claim 4 wherein said dual-fluid nozzle produces liquid droplets having Sauter size distribution of less than about 100 microns.

10. The method of claim 1 wherein said mist elimination device further comprises an additional moisture collection channel positioned on an interior surface of the outlet duct positioned to collect liquid running along the interior surface of the outlet duct.

11. An apparatus for purifying a gas stream containing gas-borne contaminants which comprises:

a scrubbing duct for conveying the gas stream from an inlet end to an outlet end, an air-water dual fluid nozzle located in the flow pipe for producing liquid droplets having a Sauter size distribution of less than about 500 microns, an electrostatic precipitator downstream of the outlet of the scrubbing duct for electrostatically separating liquid droplets from the gas stream, a mist elimination device for removal of residual droplets from the gas stream, a cyclonic separator located between the outlet of said scrubbing duct and the wet electrostatic precipitator, and a vertical drop-out chamber located between the outlet of said scrubbing duct and an inlet to said cyclonic separator, said drop-out chamber having an inlet for the gas stream located in an upper region of one wall of the chamber and a gas outlet for the gas stream located in a lower region of a wall of said chamber opposite to said one wall, a liquid outlet located in a bottom wall of the chamber, and a baffle extending downwardly from a top wall to the chamber towards the bottom wall and to below said outlet to cause the gas stream to impinge on the baffle to cause contaminant-laden droplets to be removed from the air stream prior to passing to the gaseous outlet.

12. The apparatus of claim 11 wherein said wet electrostatic precipitator has substantially vertical orientation, and comprises an upper gas inlet and lower gas outlet and a plurality of vertically-arranged electrostatic discharge and collecting electrodes between said inlet and said outlet.

13. The apparatus of claim 11 wherein said dual-fluid nozzle produces liquid droplets having a droplet size of less than 200 microns.

14. The apparatus of claim 11 wherein said dual-fluid nozzle produces liquid droplets having a droplet size of less than 100 microns.

15. An apparatus for purifying a gas stream containing gas-borne contaminants, which comprises:

a scrubbing duct for conveying the gas stream from an inlet end to an outlet end, an air-water dual fluid nozzle located in the flow pipe for producing liquid droplets having Sauter size distribution of less than about 500 microns, an eletrostatic precipitator downstream of the outlet of the scrubbing duct for electrostatically separating liquid droplets from the gas stream, said wet electrostatic precipitator having a substantially vertical orientation and comprising an upper gas inlet and lower gas outlet and a plurality of vertically-arranged electrostatic discharge and collecting electrodes between said inlet and said outlet, and a mist elimination device for removal of residual droplets from the gas stream to produce a product gas stream, said mist elimination device comprising:

an enclosure having an upper inlet in unobstructed fluid flow communication with the lower outlet of the wet electrostatic precipitator, a lower outlet for collected liquid and a second outlet for said product gas stream, a hood located generally axially in said enclosure having walls sloping downwardly from an upper crown to a lower extremity defining an exterior and a space beneath the hood, at least one moisture collection channel provided on the exterior surface of said walls positioned to collect liquid on said walls and guide the collected liquid to at least one flow channel positioned to direct collected liquid to below the hood towards said lower outlet, at least one moisture collection channel provided on an interior surface of the walls positioned to collect liquid entrained in the gas stream and passing from the exterior of the hood into the space beneath the hood, and an outlet duct communicating with the space beneath the hood and joined to the second outlet for guiding gas entering the space beneath the hood to the second outlet.

16. The apparatus of claim 15 further comprising a cyclonic separator located between the outlet of said flow pipe and the wet electrostatic precipitator.

17. The apparatus of claim 15 wherein said mist ellimination device comprises an additional moisture collection channel positioned on an interior surface of the outlet duct positioned to collect liquid running along the interior surface of the outlet duct.

18. The apparatus of claim 15 wherein said dual-fluid nozzle produces liquid droplets having a droplet size of less than 200 microns.

19. The apparatus of claim 15 wherein said dual-fluid nozzle produces liquid droplets having a droplet size of less than 100 microns.

20. A wood products drying apparatus, comprising:

a dryer for drying moist wood products at elevated temperature in an air stream fed to said dryer, a cyclone separator for separating dried wood products from the air stream, a recycle duct for recycling a portion of the air stream to the air fed to the dryer, a quench tube downstream of the cyclone separator for receiving a portion of the air stream for quenching said air stream to the adiabatic saturation temperature of the air stream and to saturate the air stream with moisture, at least one air-water dual-fluid atomizing nozzle located in said quench tube to produce fine water droplets to effect said quenching of the air stream and to entrain particulates in said air stream, a venturi and a drop-out chamber downstream of said quench tube for removing particulates and liquid droplets from the gas stream, said drop-out chamber comprising a vertical chamber located between the outlet of said venturi and an inlet to a cyclonic separator, said drop-out chamber having an inlet for the gas stream located in an upper region of one wall of the chamber and a gas outlet for the gas stream located in a lower region of a wall opposite to said one wall, a liquid outlet located in a bottom wall of the chamber, and a baffle extending downwardly from a top wall to the chamber towards the bottom wall and to below said outlet to cause the gas stream to impinge on the baffle to cause large droplets to be removal from the air stream prior to passing to the gaseous outlet, a cyclonic separator located downstream of the drop-out chamber for removing further particulates and liquid droplets from the gas stream, a wet electrostatic precipitator downstream of the cyclonic separator for electrostatically removing further particulates and liquid droplets from the gas stream, said wet electrostatic precipitator having a substantially vertical orientation and comprising an upper gas inlet and lower gas outlet and a plurality of vertically-arranged electrostatic discharge and collecting electrodes between said inlet and said outlet, a mist elimination device for removing liquid droplets from the gas stream, said mist elimination device comprising:

an enclosure having an upper inlet in unobstructed fluid flow communication with the lower outlet of the wet electrostatic precipitator to a lower outlet for collected liquid and a second outlet for said product gas stream, a hood located generally axially in said enclosure having walls sloping downwardly from an upper crown to a lower extremity defining an exterior and a space beneath he hood, at least one moisture collection channel provided on the exterior surface of said walls positioned to collect liquid on said walls and guide the collected liquid to at least one flow channel positioned to direct collected liquid to below the hood towards said lower outlet, at least one moisture collection channel provided on an interior surface of the walls positioned to collect liquid entrained in the gas stream and passing from the exterior of the hood into the space beneath the hood, and an outlet duct communicating with the space beneath the hood and joined to the second outlet for guiding gas entering the space beneath the hood to the second outlet, and a thermal oxidizer downstream of the mist elimination device for removal of volatile organic compounds from the gas stream.

21. The apparatus of claim 20 further comprises an additional moisture collection channel positioned on an interior surface of the outlet duct positioned to collect liquid running along the interior surface of the outlet duct.

22. The apparatus of claim 21 wherein said thermal oxidizer is a regenerative thermal oxidizer or a regenerative catalytic oxidizer.

23. The apparatus of claim 22 wherein at least one of said air-water dual-fluid a atomizing nozzle, venturi, drop-out chamber and cyclonic separator are replaced by a venturi scrubber comprising a venturi nozzle for receipt of said gas stream and a cyclonic chamber downstream of said venturi nozzle having a tangential inlet for the gas stream exiting the venturi nozzle, an upper outlet for the gas stream passing through the chamber and a lower outlet for particulates and droplets impinging on inner walls of said chamber and draining to said outlet.

* * * * *